Nov. 30, 1937.    P. S. RUSSEL    2,100,997
PRESSURE CONTROL DEVICE
Filed June 18, 1935    2 Sheets-Sheet 1
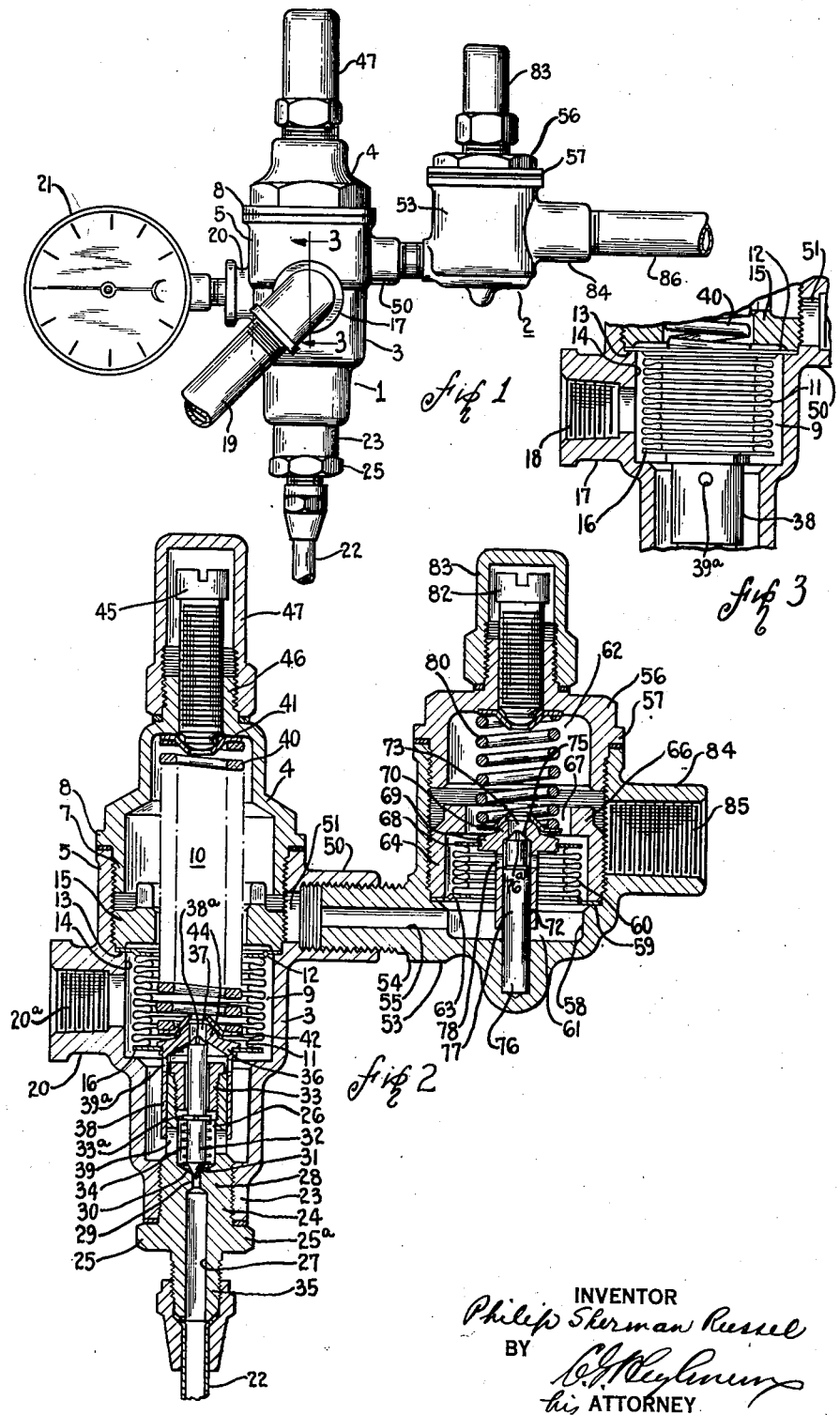

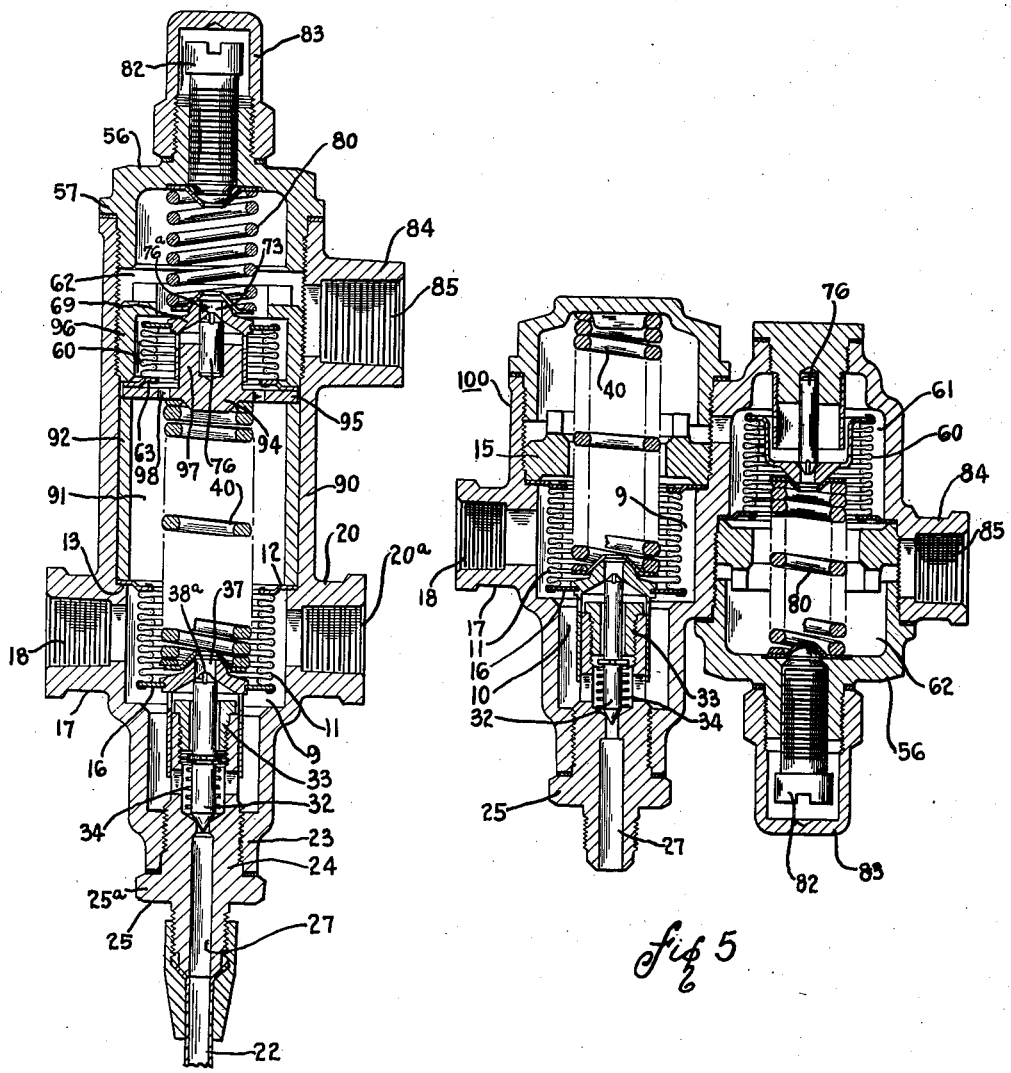

Patented Nov. 30, 1937

2,100,997

UNITED STATES PATENT OFFICE 2,100,997

PRESSURE CONTROL DEVICE

Philip Sherman Russel, Detroit, Mich., assignor to Detroit Lubricator Company, Detroit, Mich., a corporation of Michigan Application June 18, 1935, Serial No. 27,181

10 Claims. (Cl. 137—153)

My invention relates generally to control devices and more particularly to pressure control or regulating devices.

In the past, pressure control or regulating devices, in general, have not been entirely satisfactory for obtaining pressures above a certain pressure in a fluid flow line. As is well known, the more sensitive a pressure control device is to slight variations in pressure, the more nearly constant it will maintain the fluid pressure in the line, so that a certain degree of sensitivity is a necessary expedient to the efficiency of a pressure control device. In the past, pressure control devices have been provided which were suitably sensitive to variations in fluid pressure, but which, because of this, had a limited range of operation substantially corresponding to its degree of sensitivity to changes in pressure. That is to say, if these devices were employed to obtain pressures above a certain pressure, their sensitiveness of operation was impaired and their time period of useful operation materially decreased, and if employed to obtain still higher pressures they were likely to be immediately damaged and thereby rendered useless. This is particularly true of the type of pressure control device which has a movable wall means, such as a bellows or diaphragm, against which the pressure acts, for if devices of this type are subjected to pressures above a certain pressure the movable wall means is likely to be ruptured. Other pressure control devices have been provided which were sufficiently durable to withstand certain desired pressures, but such devices are inefficient in that they are usually insufficiently sensitive to slight variations in pressure.

Accordingly, it is an object of my invention to provide a new and improved pressure control or regulating device which will operate efficiently to maintain an extremely high fluid pressure substantially constant in a fluid flow line without danger of injury to the control device.

Another object of my invention is to provide a pressure control device of the type having a movable wall means, such as a bellows, against which the pressure acts and which is extremely sensitive or movable in response to slight changes in pressure in order to obtain a substantially constant pressure in the fluid flow line and to provide a control device of this character capable of obtaining higher pressure than a movable wall means would normally withstand and without danger of such pressures affecting or lowering the sensitivity of the movable wall means or otherwise decreasing its efficiency.

Another object of my invention is to provide a new and improved fluid pressure control device which has a wide pressure operating range.

The invention consists in the improved construction and combination of parts to be more fully described hereinafter and the novelty of which will be particularly pointed out and distinctly claimed.

In the accompanying drawings, to be taken as a part of this specification, I have fully and clearly illustrated my invention, in which drawings—

Figure 1 is a view shown in side elevation of my new and improved pressure control device in a fluid flow line;

Fig. 2 is a view shown in cross-section taken longitudinally through the device of Fig. 1;

Fig. 3 is a detailed view shown in cross-section taken along the line 3—3 of Fig. 1;

Fig. 4 is a view shown in longitudinal cross-section of a modified form of my pressure control device, and Fig. 5 is a view shown in longitudinal cross-section of another modified form of my pressure control device.

Referring to the drawings and more particularly to Figs. 1 and 2, my pressure control device comprises, in this instance, a pressure control unit designated generally by the numeral 1, and an auxiliary pressure control unit detachably associated therewith and designated generally by the numeral 2. The pressure control unit 1 includes a sectionally constructed casing including a hollow casing section or body portion 3 closed at one end, or its upper end, as seen on the drawings, by a hollow extension section or cap 4. The inner wall of casing 3 is preferably circular in contour and has a portion 5 of relatively large diameter leading out of its upper end, the wall of the portion of enlarged diameter preferably being internally threaded for receiving an externally threaded portion or shank 7 of the casing section or cap 4. The cap 4 may be formed with an external annular shoulder 8 for seating against the end wall of casing 3, and between the shoulder 8 and the wall of the casing there may be provided a washer to insure a fluid-tight connection therebetween.

The interior of the sectionally constructed casing is divided, in this instance, into two chambers 9 and 10 by a movable wall means disposed in the casing and which may be an expansible-collapsible element such as a substantially cylindrical, circumferentially corrugated, resilient metallic bellows 11. One end of the bellows 11 is preferably hermetically secured and sealed to a ring-like mounting plate 12, which plate seats on an annular shoulder 13 formed on the inner wall of casing 3 between the threaded portion 5 of enlarged diameter and a portion or bore 14 of reduced diameter. A clamping ring 15 may be provided for clamping the ring-like member 12 against its seat, and may be externally threaded for screw-threading into the threaded portion 5 of enlarged diameter of the casing 3. The clamping ring 15 may be provided, if desired, with a circumferential extended portion on its inner end, as shown, for engaging a circumferential border portion of the ring 12. Preferably the clamping ring 15 has a central opening therethrough in axial alignment with the bellows 11. The bellows 11 extends into chamber 9 and the free or movable end thereof is preferably hermetically secured to and sealed by a flat ring-like plate 16.

The casing 3 is preferably formed having an integral boss 17 extending externally from the side wall thereof and having a passageway 18 therethrough which constitutes the inlet and leads into chamber 9. In Fig. 1 there is shown a pipe or conduit 19 connected to the inlet boss 17 and which may be the feed line from a source of fluid supply which may be oil, or other fluid. The conduit 19 may be threaded for threaded connection with the boss 17, or it may be connected thereto by a nipple, or in any other suitable manner. The casing 3, in this instance, is also formed with a second boss 20 having a passageway 20a leading out of chamber 9, and connected to the boss 20 there is a pressure indicating device 21 which may be of any suitable type for indicating the pressure of the fluid in chamber 9. The lower end of the pressure control unit 1 constitutes the outlet end, in this instance, and connected thereto is shown a conduit or pipe 22 through which the fluid from chamber 9 flows under a substantially constant pressure maintained by the control device and which conduit may be the feed line to an oil burner (not shown). Any suitable pumping unit capable of conveying fluid through the line under extremely high pressure may be employed.

One end of the casing 3 or lower end, as seen on the drawings, has a portion of reduced diameter, as at 23, which is internally threaded for receiving an externally threaded portion 24 of a valve seat member 25. The valve seat member 25 is preferably cylindrical in form and extends into chamber 9 and toward and in axial alignment with the bellows 11. The valve seat member 25 may be formed with an external annular flange 25a to provide a shoulder for abutment against the end wall of casing 3, and between the end wall of the casing and the annular shoulder 25a there may be provided a washer, as shown, to insure a fluid-tight connection therebetween. The valve seat member 25 has a central passageway longitudinally therethrough which is in axial alignment with the bellows 11 and which passageway includes a bore 26 which leads out of the inner end of the member 25, and a bore 27 which leads out of the outer end of member 25, the bores being separated by a transverse wall 28 intermediate the ends of member 25. The transverse wall 28 has a centrally disposed bore or orifice 29 therethrough in alignment with and connecting bores 26 and 27 and which forms, with bore 26, a seat 30 for cooperating with the conical face 31 of a needle valve 32. The bore 26 preferably has an internally threaded portion at its inner end for receiving an externally threaded tubular member 33 through which valve 32 extends, the bore of the tubular member 33 being sufficiently larger than the diameter of the valve member 32 to insure unrestricted reciprocal movement of the valve relative thereto. The valve 32 is provided intermediate its ends with an external annular flange 33a, and surrounding the valve 32 there is a coil spring 34 having one end bearing against the annular flange 33a and the other end bearing against the inner end wall of bore 26 provided by the transverse wall 28. The spring 34 normally urges the valve 32 away from its seat 30, or toward open position. When the valve 32 is seated, as shown in Fig. 2, there is a space between the flange 33a and the adjacent inner end of the tubular member 33, the inner end of the tubular member serving as a stop to limit movement of valve 32 in a valve opening direction by the spring 34. The valve seat member 25 has an outwardly extending reduced portion 35 which may be externally threaded for connection with the conduit 22, such as by means of a nipple or other suitable means.

In order to provide an efficient pressure control device and one capable of controlling extremely high pressures, I provide for the flow of fluid, which may be a liquid, into chamber 10 as well as chamber 9, and maintain the pressure of the liquid in chamber 10 acting against one side of the bellows 11, substantially constant and less than the pressure of the liquid in chamber 9 acting on the other side of the bellows 11. The pressure of the fluid in chamber 10 acting on one side of the bellows partially counteracts the pressure of the fluid acting against the other side of the bellows, so that the actual or effective pressure on the bellows will be the difference between the opposing pressures. To this end, I provide for by-passing the liquid from chamber 9 to chamber 10 when the pressure in chamber 9 exceeds a predetermined pressure. Carried by the movable end of the bellows 11 there is a valve seat member 36 which is preferably in coaxial alignment with the bellows 11 and which may be secured to the ring-like plate member 16 thereof. In the present instance, the valve seat member 36 extends through the ring-like member 16 and partway into the bellows 11. The valve seat member 36 has a centrally disposed aperture or bore 37 which constitutes the by-pass for the passage of liquid from chamber 9 to chamber 10. The valve seat member 36 may be secured to the ring-like member 16 in any suitable manner such as, for example, the valve seat member may be provided with an external annular shoulder for abutment against one side of the ring-like member 16, and the valve seat member may be peened over on the other side of the member 16 to rigidly secure the parts together. The valve seat member 36 is also preferably formed with a tubular portion 38 which extends toward and slidably telescopes over the inner end portion of the valve seat member 25 and which serves as a guide for the reciprocal valve seat member 36. In the side wall of the valve seat member 25 and within chamber 9, there is provided apertures or bores 39 which provide communication between the chamber 9 and the bore or valve chamber 26. In the side wall of the tubular guide member 38, and preferably adjacent the movable end of the bellows 11, there is provided a plurality of apertures 39a for the passage of liquid from chamber 9 to the interior of the tubular member 38 for passage therefrom through the by-pass port or passage 37. The valve 32 extends toward the port 37 in axial alignment therewith, and the end of the valve adjacent thereto is preferably conical in form having a conical face for cooperating with port 37 to control flow of liquid therethrough. The conical face of the valve may be provided with a slot, as at 38ª, to permit the flow of some liquid from chamber 9 to chamber 10 when the valve 32 is seated and to permit the escape of air into chamber 10 when flow is first started through the line. The valve 32 thus serves to control flow of liquid through the outlet 27 and also through the by-pass port 37 leading into chamber 10.

A resilient thrust member such as a coil spring, indicated at 40, is disposed in chamber 10 and urges the movable end wall of bellows 11 in a direction tending to close both the outlet port 29 and the by-pass port 37. Bearing members 41 and 42 are preferably provided and retained in the opposite ends of the spring 40, and preferably the bearing members have centrally disposed conically formed portions which extend inwardly or toward each other when the bearing members are in position. The valve seat member 36 has a centrally disposed extended portion 44 extending into the bellows and chamber 10, and the extended portion preferably has a convex or rounded surface for receiving the conical-formed portion of the bearing member 42 which is held in engagement therewith by the spring 40. Preferably the bearing member 42 has a centrally disposed aperture which substantially aligns with the by-pass port 37 for the passage of liquid therethrough. The extended portion 44, cooperating with the bearing member 42, maintains the same in proper position and thus prevents dislocation of the adjacent end of spring 40. The end wall of the extension section or cap 4 is preferably provided with an externally extending reduced portion 46 having a threaded bore therethrough for receiving an adjusting screw 45. The adjusting screw 45 extends in axial alignment with the spring 40 and the inner end of the screw is adapted to engage in the centrally disposed conical portion of the bearing member 41. By means of the adjusting screw 45, it will be seen that the compression force of the spring 40 may be varied, as desired. The extended portion 46 is preferably externally threaded for receiving an internally threaded cap 47 provided to enclose the adjusting screw 45.

The casing 3 is formed with an integral boss 50 having a passageway 51 therethrough which may be a bore, and which leads out of chamber 10. The boss 50 is preferably formed on a side wall of the casing 3, and located so that the bore 51 thereof communicates with chamber 10 above the clamping ring 15. The auxiliary pressure control unit 2 is connected to the pressure control unit 1 and includes a hollow casing 53 which has a laterally extending boss 54 adjacent its lower end having a bore therethrough which leads into the casing 53. The boss 54 may be externally threaded for threading into the internally threaded boss 50 of the casing 3, or the control units may be connected in any other suitable and fluid-tight manner to provide communication between chamber 10 and the interior of casing 53. The auxiliary pressure control device includes a hollow extension section or cap 56 which closes one end of the casing 53 and which preferably has an external annular flange, as at 57, for seating on the end wall of casing 53. The inner wall of casing 53 is preferably circular in contour and internally threaded for receiving an externally threaded portion or shank of the extension or cap 56. The inner wall of the casing 53 preferably has a portion of smaller diameter, as at 58, adjacent the bottom wall of the casing and which provides an upwardly facing annular shoulder or seating surface 59, the shoulder 59 preferably being located adjacent, but above, the inlet of bore 55. A movable wall means or expansible-collapsible element, which may be a substantially cylindrical, circumferentially corrugated, resilient metallic bellows 60 is disposed in the casing 53 and divides the interior thereof into two chambers 61 and 62. One end of the bellows is hermetically secured and sealed to a flat ring-like member 63 which seats on the annular shoulder 59, and which may be tightly clamped thereagainst by a tubular shaped clamping ring 64. One end of the clamping member bears against an outer border portion of the mounting ring 63, circumferentially thereof. The tubular-shaped clamping member 64 surrounds the bellows 60 and preferably has a transverse end wall 66 having a central opening 67 therethrough, the transverse wall 66 being disposed between the free end of the bellows 60 and the cap 56. The clamping member 64 may be externally threaded for screw-threading into the internally threaded casing portion of enlarged diameter. The inwardly disposed and free, or movable, end of the bellows 60 is hermetically secured and sealed to a ring-like member 68 which is disposed adjacent the transverse wall 67 and which wall serves as a stop to prevent undue expansion of the bellows 60.

Carried by the movable end of the bellows there is a valve seat member 69 which may be fixed to the flat ring-like member 68 in any suitable manner. In the present instance, the valve seat member 69 has a wall portion which extends transverse to the axis of the bellows 60 and around its outer periphery it has a slot in which the inner edge of the ring member 68 is clamped. The valve seat member 69 has a centrally disposed extended portion 70 extending into chamber 62 and an aligned extended portion 71 extending in chamber 61. Longitudinally through the valve seat member there is provided a passageway in the form of a bore 72 which has a reduced portion 73 at the inner end of the valve seat member leading out of the extended portion 70 into chamber 62. The reduced bore provides a valve seat for cooperating with the conical face 75 of a needle valve 76. Preferably the conical face of the valve 76 has a cross-slot or groove 76ª therein to permit some fluid to pass from chamber 61 to chamber 62 when the valve is seated and to permit the escape of air. The valve 76 is preferably fixed relative to the valve seat member 69 and one end of the valve may be fixedly secured in the lower wall of the casing 53, as shown. The tubular extended portion 71 of the valve seat 36 telescopes over the valve member 76 in slidable relation thereto and guides the free end of the bellows in its reciprocal movement. An end portion of the valve member 76 is of reduced diameter, as at 77, to provide an annular chamber between the inner wall of bore 72 and the outer wall of the reduced portion 77. In the side wall of the extended portion 71 there is provided a plurality of apertures 78 through which fluid can flow from chamber 61 into the annular chamber in the tubular extension 71 for passage therefrom through by-pass port 73.

Disposed in chamber 62 of the casing there is provided a coil spring 80 in the opposite ends of which are disposed bearing members, like the members 41 and 42 previously described in connection with the associated pressure control unit 1. The auxiliary pressure control device also has an adjusting screw, indicated at 82, by means of which the spring 80 may be placed under greater or less compression, as desired. The adjusting screw 82 is enclosed by a cap 83 which is similar to the cap 47 closing the adjusting screw 45 of the unit 1. As in the previously described unit 1, the end of the adjusting screw 82 and extended portion 70 of the valve seat member serve to retain the ends of spring 80 in proper position. The casing 53 has an outlet for the chamber 62, the outlet preferably being defined by an externally extending integral boss 84, formed on the side wall of casing 53 and having a bore 85 leading out of the chamber 62. Connected to the boss 84, as shown in Fig. 1, there is a conduit or pipe 86 through which by-passed fluid, which may be oil, is preferably returned to the source of supply.

The operation of my pressure control device to maintain a substantially constant and extremely high pressure in a fluid flow line is as follows: If it is desired to maintain a pressure of say 250 lbs. in the line, the control device may be adjusted to obtain this pressure in the following manner: By means of the adjusting screw 82 of the auxiliary pressure control device 2, the compression force on spring 80 may be reduced to the point where it no longer affects the pressure of the fluid in the line. By means of the adjusting screw 45 of the control unit 1, the spring 40 may be placed under a compression force such that the pressure indicator 21 shows that the pressure of the fluid in chamber 9 is one half of that desired, or 125 lbs. pressure. Then, by means of the adjusting screw 82 of the auxiliary unit, the spring 80 thereof may be placed under a compression force such that the indicator shows that the pressure of the fluid in chamber 9 is that desired, or 250 lbs. pressure.

If the control devices are set, as above described, the spring 40 will exert a force corresponding to a pressure of 125 lbs. and tending to expand the bellows 11 and maintain both the by-pass port 37 and the outlet port 29 closed. When the flow of a fluid, which may be oil, is first started through the line, the oil enters chamber 9 and the pressure therein, and consequently the force exerted by the oil acting on the bellows, increases. When the force exerted by the oil on the bellows in chamber 9 increases above the force exerted by spring 40, then the bellows 11 will be collapsed in accordance with the increase of force. The coil spring 34 will act to move the valve member 32 away from its seat until such time as the flange 33ª of the valve member 32 engages its stop member, after which, upon continued compression movement of the bellows, the by-pass port 37 will be opened. Oil then flows from chamber 9 into chamber 10 and the pressure in chamber 10 builds up. The auxiliary control device 2 controls the pressure of the oil in chamber 10 to maintain the pressure therein substantially constant. The pressure that will be maintained by the auxiliary control device in chamber 10 will be 125 lbs. when the control device is set, as previously described. When the pressure in chamber 9 is 250 lbs. pressure, the pressure of the oil in chamber 9 will be 125 lbs. pressure and the spring 40 will be exerting a force corresponding to 125 lbs. so that the force tending to collapse bellows 11 will be opposed by a substantially equal force tending to expand the bellows 11.

When the pressure of the oil, or other fluid, decreases in chamber 9 below the desired pressure, which may be 250 lbs. pressure, it will be seen that the valve seat member will be moved toward the adjacent conical end of the valve 32, and if the pressure in chamber 9 decreases below a certain pressure then the by-pass port 37 will be closed by the valve. Oil will then flow from chamber 9 only through the outlet port 29. Further decrease in the pressure in chamber 9 causes the valve 32 to be moved toward outlet port 29 thereby diminishing flow therethrough resulting in increase in the pressure in chamber 9. Since the pressure of the oil in chamber 10, acting on one side of the bellows, partially counteracts the pressure of the oil in chamber 9 acting on the other side of the bellows, it will be seen that the effective or actual pressure exerted on the bellows will be the difference between the two pressures, or 125 lbs. When the pressure of the oil in chamber 10 increases above 125 lbs. pressure, then the bellows 60 of the auxiliary unit is expanded, which results in the by-pass port 73 of the valve member carried thereby being opened. Oil then flows through the by-pass port 73 into chamber 62 from whence it passes through the return conduit 86 to the source of supply. The pressure on one side of the bellows 60, exerted by the oil in chamber 61, is the same as the pressure of the oil in chamber 10, or 125 lbs., while on the other side of the bellows 60 the gauge pressure is substantially zero, so that the actual gauge pressure on this bellows is 125 lbs.

From the foregoing description it will now be seen that I have provided a new and improved fluid pressure control device which is sensitive to slight variations in pressure and which is adaptable to obtain higher pressures than are normally obtainable while retaining its sensitivity characteristic and without danger of injury to the device. In my control device the pressure in chamber 9, and therefore in the line, can be maintained very nearly constant for the bellows 11 can be of a very sensitive character without danger of its being ruptured or otherwise unduly affected by pressures which would otherwise rupture the bellows, for the actual or effective pressure on the bellows can be less than that which would cause it to be injured. Another advantage of my control device is that pressures within a wide range are attainable. It will be seen that by releasing the compression force of the spring 80, a relatively low pressure can be obtained in chamber 9. Therefore, my control device has a pressure range from the lowest pressure attainable by the control unit 1, to the highest pressure attainable by the combined units. It is also pointed out that a higher pressure than that attainable with two control units may be had by combining three or more units, and that the pressure that can be obtained will be limited only by the pressure that the walls of the casings can withstand, and the inability of a pumping unit to convey a fluid through the line under such a pressure.

Referring now to Figs. 4 and 5 of the drawings, the operating parts of these forms of my pressure control device are substantially the same as those of the control device of Figs. 1 and 2, and are therefore designated by the same numerals. The pressure control device of Fig. 4 differs from the device of Figs. 1 and 2 in that the units are enclosed in a common casing 90 preferably of tubular form, as shown. The bellows 11 and 60 are in spaced relation and in axial alignment in the casing 90 dividing the interior thereof into the relatively high pressure chamber 9, the chamber 61, and an intermediate chamber 91. A predetermined fluid pressure is maintained substantially constant in chamber 91 for partially counteracting the pressure of the liquid in chamber 9 acting against the bellows 11. A spacer member 92 which may be a tubular sleeve member, as shown, spaces the bellows 11 and 60 and has one end bearing against the seating shoulder 13 and seating on an outer circumferential marginal border portion of the mounting ring 12 of the bellows 11. The tubular spacer member 92 extends from the annular seating shoulder 13 to a point adjacent the by-pass outlet 85, and on the end thereof is mounted a valve supporting member 94 which includes a plate portion 95 which seats on the end of the tubular member. The mounting ring 63 of the bellows 60 seats on the plate portion 95 of the valve supporting member 94 and the bellows 60 extends into chamber 62. An externally threaded tubular clamping member 96 is screw-threaded into the casing and surrounds the bellows 60, and the inner end of the tubular clamping member 96 engages an outer border portion of the mounting ring 63 circumferentially thereof, and clamps the ring, valve supporting member 94, sleeve 92 and mounting ring 12 of bellows 11 tightly together and against the annular seating shoulder 13. The valve supporting member 92 has a centrally disposed extended portion 97 which may be cylindrical in form and which extends into the bellows 60 and over which the tubular portion of the by-pass valve seat member 69 telescopes and by which it is guided in its reciprocal movement. The extended portion 97 is recessed having a centrally disposed bore into which an end portion of the valve member 76 extends and is fixed therein. Through the plate portion 95 there is provided a plurality of apertures 98 through which fluid may flow from chamber 91 to the interior of the bellows 60. In the control device of Fig. 4 only the compression force on the spring 80 is adjustable. It will be seen that the force exerted by the spring 80 will determine the pressure that will be necessary for the fluid in chamber 91 to exert against the bellows 60 in order to open the by-pass port 73. The pressure of the fluid in chamber 91 can thus be varied by means of the adjusting screw 82 and since change in pressure in chamber 91 will cause a change in pressure in chamber 9, the pressure in chamber 9 is variable by means of the spring adjusting screw 82.

In the control device of Fig. 5, the casing 100 encloses both of the pressure control units and is formed so that one of the units is disposed at one side of the other, or lateral thereto, to provide a compact device. The bellows 60 is arranged in the casing so that it is compressed upon increase in pressure in chamber 62 instead of expanded, as is the case in the device of Fig. 4.

The operation of the control devices of Figs. 4 and 5 is the same as that previously described in connection with the control device of Figs. 1 and 2.

What I claim and desire to secure by Letters Patent of the United States is:

1. A pressure regulating device comprising a casing having an inlet and an outlet, and a pressure chamber for receiving fluid under pressure and through which chamber the inlet and the outlet communicate, said casing having a second pressure chamber for receiving fluid under pressure, said second-named chamber having an outlet, flexible pressure responsive means in said casing and acted upon by the pressures of the fluids in both of said chambers, said pressures opposing each other with the pressure of the fluid in said second-named chamber being greater than atmospheric pressure and less than the pressure in the first-named chamber, a valve for controlling flow from said first-named outlet and actuated by said pressure responsive means, valve means controlling the outlet of said second-named chamber, and pressure responsive means for actuating said valve means, said last-named pressure responsive means being responsive to the pressure in said second-named chamber to maintain a substantially constant pressure therein.

2. A pressure control device comprising a casing having an inlet and an outlet for fluid, a movable wall means in said casing dividing the interior thereof into a first chamber and a second chamber, said inlet and said outlet leading respectively into and out of said first-named chamber, a valve controlling said outlet and having operative connection with said movable wall means, a passageway connecting said chambers, valve means controlling flow through said passageway and movable toward open position when the pressure of the fluid in said first-named chamber acting against said movable wall means exceeds a predetermined pressure, said second-named chamber having an outlet passage, and pressure responsive means for controlling said second-named passage and operable to maintain a predetermined substantially constant pressure in said second-named chamber for partially counteracting the pressure in said first-named chamber acting against said wall means.

3. A pressure regulating device for a fluid flow line comprising a casing having an inlet and an outlet, a movable wall means in said casing dividing the interior thereof into a first pressure chamber and a second pressure chamber for receiving fluid under pressure to exert pressures on opposite sides of said wall means, a valve controlling flow from said outlet and having operative connection with said movable wall means, a passage for flow of fluid from said first-named chamber when the pressure of the fluid therein acting against said movable wall means exceeds a predetermined pressure, and an auxiliary pressure regulating device for maintaining a substantially constant fluid pressure in said second-named chamber acting against said wall means.

4. In a fluid flow line, a pressure control device comprising a casing having a pressure chamber with an outlet orifice for restricting flow from said chamber and to which chamber fluid is delivered in a larger quantity than can flow in unit time through the orifice at pressures within a desired pressure range, a movable wall means in said casing and cooperating therewith to form said chamber, a second movable wall means in said casing in spaced relation to said first-named wall means, said first-named wall means and said second-named wall means forming movable wall portions of a second pressure chamber, by-pass means for by-passing fluid from said first-named chamber to said second-named chamber and controlled by movement of said first-named movable wall means, means to release fluid from said second-named chamber and controlled by said second-named movable wall means for maintaining a predetermined substantially constant fluid pressure in said second-named pressure chamber and less than the pressure in said first-named chamber for partially counteracting the pressure exerted by the fluid in said first-named chamber, said first-named movable wall means acting on movement to by-pass fluid to said second-named chamber when the pressure differential of the pressures acting against opposite sides of the first-named movable wall means increases.

5. A pressure relief valve comprising a casing having an inlet for fluid, a movable wall means in said casing and having one side thereof cooperating with the interior of said casing to provide a pressure chamber into which said inlet leads, said chamber having an outlet, a second movable wall means associated with the first-named movable wall means, said first-named and said second-named movable wall means each forming a wall portion of a second pressure chamber, by-pass means for by-passing fluid from said first-named chamber to said second-named chamber, a valve controlling said by-pass means and having operative connection with said first-named movable wall means, said first-named movable wall means being movable in response to a change in the pressure differential between the pressures acting on opposite sides thereof, the pressure in said second-named chamber being maintained less than the pressure in the first-named chamber to partially counteract the same, said second-named chamber having an outlet port, and an outlet valve controlling said outlet port and having operative connection with said second-named movable wall means, said second-named movable wall means being movable in response to a change in the pressure in said second-named chamber and being operable when the pressure therein exceeds a predetermined pressure to open said outlet valve.

6. A pressure control device comprising a casing, a plurality of movable wall means in spaced relation in said casing and cooperating with the interior thereof and with each other to provide a plurality of successive pressure chambers including a main chamber, said casing having an inlet leading into the main chamber and an outlet orifice leading therefrom for restricting the flow of fluid from said main chamber, by-pass means for each of said chambers for by-passing fluid from said main chamber to successive chambers, said by-pass means being controlled by said movable wall means with one of said wall means controlling one of said by-pass means, each of said movable wall means being movable to by-pass fluid to the next chamber when the pressure differential of the pressures acting on opposite sides of that movable wall means increases, and a plurality of thrust members, one for each of said movable wall means for exerting a force opposing movement of its wall means, each successive thrust means exerting a force less than the force of the preceding thrust means whereby to obtain pressures in said pressure chambers successively decreasing in pressure from the main chamber to the last of said pressure chambers.

7. A pressure control device comprising a casing having an inlet and an outlet for liquid, two movable wall means disposed in spaced relation in said casing and dividing the interior thereof into a first chamber into which liquid flows through said inlet and further dividing said interior into a second and a third chamber, valve means controlling said outlet and having operative connection with one of said movable wall means, by-pass means for by-passing liquid from said first-named chamber to said second-named chamber when the pressure of the liquid in said first-named chamber exceeds a predetermined pressure, said by-pass means being controlled by said movable wall means, and by-pass means for by-passing liquid from said second-named chamber and controlled by said other movable wall means to maintain a predetermined pressure in said second-named chamber and less than the pressure in said first-named chamber to partially counteract the same, resilient thrust means in said second-named chamber urging one of said movable wall means in a direction opposing the pressure of the liquid in said first-named chamber, and a second resilient thrust means in said third-named chamber and urging the other of said wall means in a direction opposing the pressure of the liquid in said second-named chamber.

8. A control device comprising a casing having an inlet and an outlet for fluid, said casing having an internal annular shoulder, a bellows member dividing the interior of said casing into a pressure chamber and a second chamber, said bellows member having an annular wall means at one end seating on said shoulder and having a movable wall member carried by its other end, said movable wall member having a valve port therethrough, a tubular member surrounding said bellows member and engaging and clamping said annular wall means against said annular shoulder, said tubular member having an end wall disposed adjacent and serving as a stop for the movable end wall member of said bellows member, said wall being provided with an aperture therethrough, a fixed valve member extending centrally through said bellows member and cooperable with said valve port to control flow therethrough, and a spring disposed in said second chamber and extending through said aperture to act on said movable end wall member for opposing the opening of said valve port at pressures below a predetermined pressure.

9. In a pressure regulating device, a casing having an inlet and an outlet for fluid, said casing having an internal shoulder, a bellows member cooperating with inner wall portions of said casing to provide an expansible fluid pressure chamber through which said inlet and said outlet communicate, said bellows member having an annular wall means at one end seating on said internal shoulder and at its other end having a movable wall means provided with a valve port therethrough, a tubular spacer member having one end engaging said annular wall means and supported on said shoulder, a second bellows member in said casing in axial alignment with said first-named bellows member and having an annular wall means seating on the other end of said tubular spacer member, said bellows members forming walls of a second pressure chamber into which fluid flows from said first-named chamber through said valve port, a reciprocal valve member in said first-named chamber operable by said first-named bellows member to control flow through said outlet and cooperable with said valve port to by-pass fluid from said first-named chamber to said second-named chamber when the pressure in said first-named chamber exceeds a predetermined pressure, a spring in said second-named chamber and acting to close said valve port, a second tubular member surrounding said second-named bellows member with one end bearing against the annular wall means thereof, said second-named tubular member clamping said bellows members and said first-named tubular member together and against said shoulder said second-named bellows member cooperating with inner wall portions of said casing to provide a third chamber having an outlet therefrom, a valve member cooperable with said second-named bellows member in response to variations in pressure in said second-named chamber to control flow therefrom to said third-named chamber, said second-named bellows member being operable in response to variations in pressure in said second-named chamber to maintain the pressure therein at a predetermined pressure less than the pressure in said first-named chamber to partially counteract the same, and a spring in said third-named chamber opposing movement of said second-named bellows member by the pressure of the fluid in said second-named chamber.

10. In a pressure regulating device for maintaining the discharge of fluid at a constant high pressure, a casing having a passageway therethrough with an inlet, a pair of spaced flexible pressure responsive members interposed in said passageway and providing an intermediate pressure chamber therein, each of said members having a valve port, a valve member cooperable with each of said ports, said casing having an outlet from said passageway on the inlet side of said chamber, a valve for said outlet and controlled by the one of said flexible members on the inlet side of said chamber, said one flexible member acting to open said outlet valve at a predetermined fluid pressure in said inlet and acting to open its valve port at a predetermined greater pressure and further acting to maintain said outlet valve open at an inlet pressure which would deleteriously affect said one flexible member, the other of said flexible members controlling its valve port to establish and maintain a predetermined fluid pressure in said chamber so that the effective pressure acting on said one flexible member will be less than the pressure in said passageway inlet which would deleteriously affect said one flexible member and so that the force exerted by the inlet fluid pressure will be borne by both of said responsive members.

PHILIP SHERMAN RUSSEL.